UNITED STATES PATENT OFFICE.

HENRY S. BRADLEY, OF GAINESVILLE, GEORGIA.

COMPOST.

SPECIFICATION forming part of Letters Patent No. 250,706, dated December 13, 1881.

Application filed October 31, 1881. (No specimens.)

*To all whom it may concern:*

Be it known that I, HENRY S. BRADLEY, of Gainesville, in the county of Hall and State of Georgia, have invented a new and useful Improvement in Composts for Restoring Worn-Out Lands, which improvement is fully set forth in the following specification.

The object of my invention is to produce a new and useful compound for the restoration of worn-out lands and for general fertilizing purposes for all kinds of crops and adapted to any soil.

My compound consists of the following ingredients: stable-manure, swamp muck or rich dirt, slaked lime, sulphate of ammonia, alum, powdered fine, and sulphuric acid. These are used in the following proportions: stable-manure, one thousand (1,000) pounds; swamp muck or rich dirt, one thousand (1,000) pounds; slaked lime, one (1) bushel; sulphate of ammonia, eight (8) pounds; alum, one (1) pound; sulphuric acid, eight (8) pounds. These ingredients are compounded in the following manner: Thoroughly mix the stable-manure, swamp muck or dirt, lime, sulphate of ammonia, and alum in a pit or vat made for the purpose. After these have all been well mixed the sulphuric acid is sprinkled on the mixture, the compost being thoroughly mixed up and stirred meanwhile and forked up from the bottom, so as to bring the sulphuric acid in contact with the compound and thoroughly permeate it.

The compound must be covered over, so as not to be exposed to the air, and in ten or fifteen days it will be ready for use.

Four hundred pounds of this should be used per acre.

I am aware that these ingredients are used for fertilizing purposes; but I have no knowledge that they are used in the proportions named or manipulated in the manner here specified.

Having described my invention, what I claim is—

The herein-described composition to be used for restoring worn-out lands and for general fertilizing purposes, consisting of stable-manure, swamp muck or rich dirt, lime, sulphate of ammonia, alum, and sulphuric acid, in the proportions herein specified.

HENRY S. BRADLEY.

Witnesses:
    E. S. WILEY,
    I. N. LODER.